(12) United States Patent
Okada et al.

(10) Patent No.: US 10,024,312 B2
(45) Date of Patent: Jul. 17, 2018

(54) ON-VEHICLE ELECTRONIC DEVICE AND MOTOR-DRIVEN COMPRESSOR

(71) Applicant: KABUSHIKI KAISHA TOYOTA JIDOSHOKKI, Kariya-shi, Aichi-ken (JP)

(72) Inventors: Satoshi Okada, Kariya (JP); Shinya Sato, Kariya (JP); Takao Kawasaki, Kariya (JP); Tetsuya Yamada, Kariya (JP); Kenji Maemura, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 214 days.

(21) Appl. No.: 14/939,096

(22) Filed: Nov. 12, 2015

(65) Prior Publication Data
US 2016/0141953 A1 May 19, 2016

(30) Foreign Application Priority Data

Nov. 17, 2014 (JP) ................................ 2014-232956

(51) Int. Cl.
*F04B 39/12* (2006.01)
*F04B 35/04* (2006.01)
(Continued)

(52) U.S. Cl.
CPC ............ *F04B 35/04* (2013.01); *F04C 23/008* (2013.01); *B60R 16/0207* (2013.01); *B60R 16/03* (2013.01); *F04B 39/121* (2013.01); *F04C 18/0207* (2013.01); *F04C 18/34* (2013.01); *F04C 2240/30* (2013.01); *F04C 2240/803* (2013.01); *F04C 2240/808* (2013.01); *H02K 11/00* (2013.01)

(58) Field of Classification Search
CPC ....... H01L 2924/181; H01L 2924/3025; H01L 23/552; H02K 11/33; H02K 11/01; H02K 11/00; H02M 1/44; H02M 7/003; F04B 39/121; F04B 35/04; F04C 23/008; F04C 18/0207; F04C 18/34; F04C 2240/808; F04C 2240/803; F04C 2240/30; B60R 16/0207; B60R 16/03; H01F 17/04; F03B 39/121

See application file for complete search history.

(56) References Cited

U.S. PATENT DOCUMENTS

2013/0034975 A1* 2/2013 Yoshida ................. H01R 12/57
439/78
2014/0182921 A1 7/2014 Imahori

FOREIGN PATENT DOCUMENTS

JP          4-116424 U     10/1992
JP          06076887 A  *  3/1994
(Continued)

OTHER PUBLICATIONS

English translation of JP06076887A dated Mar. 17, 1994.*
(Continued)

*Primary Examiner* — Nathan Zollinger
(74) *Attorney, Agent, or Firm* — Sughrue Mion, PLLC

(57) ABSTRACT

An inverter includes a bus bar as a wiring and a ferrite core that covers the bus bar to absorb electromagnetic noise from the bus bar. The bus bar and ferrite core are integrated by mold forming using a resin material in a state of exposing a part of the ferrite core.

7 Claims, 4 Drawing Sheets

(51) Int. Cl.
*F04C 23/00* (2006.01)
*B60R 16/03* (2006.01)
*F04C 18/34* (2006.01)
*F04C 18/02* (2006.01)
*H02K 11/00* (2016.01)
*B60R 16/02* (2006.01)

(56) References Cited

FOREIGN PATENT DOCUMENTS

| | | |
|---|---|---|
| JP | 7-263252 A | 10/1995 |
| JP | 2006-245160 A | 9/2006 |
| JP | 5040818 B2 | 10/2012 |
| JP | 2014-130708 A | 7/2014 |
| KR | 10-2013-0018554 A | 2/2013 |

OTHER PUBLICATIONS

Communication dated Feb. 17, 2017, issued by the Korean Intellectual Property Office in corresponding Korean Application No. 10-2015-0159595.
Communication dated Jan. 9, 2018, issued by the Japanese Patent Office in corresponding Japanese Application No. 2014-232956.

\* cited by examiner

ON-VEHICLE ELECTRONIC DEVICE AND MOTOR-DRIVEN COMPRESSOR

BACKGROUND OF THE INVENTION

The present invention relates to an on-vehicle electronic device and a motor-driven compressor.

An on-vehicle electronic device to be mounted in a vehicle has wiring. For example, Japanese Laid-Open Patent Publication No. 2006-245160 describes that a ferrite core to reduce electromagnetic noise to be generated in the wiring is housed in a case.

Because of being mounted in a vehicle, the on-vehicle electronic device is easily subject to vibration. Therefore, as disclosed in Japanese Laid-Open Patent Publication No. 2006-245160, in the construction in which a ferrite core is housed in a case, it is likely that the wiring and the ferrite core are shifted in relative position or the ferrite core is worn down.

The present inventors have found to integrate the wiring and the ferrite core by mold forming using a resin material. However, in this case, the following problem occurs.

When integrating wiring and a ferrite core by mold forming, it has been proposed, for example, to fill a flowable resin material in the mold. In this case, the ferrite core is subject to stress by the resin material shrinking with solidification of the resin material. An inverse magnetostrictive effect is thereby produced to reduce the impedance of the ferrite core. In this case, the ability to reduce electromagnetic noise by the ferrite core is reduced.

SUMMARY OF THE INVENTION

It is an object of the present invention to provide an on-vehicle electronic device and a motor-driven compressor capable of suppressing a reduction in the electromagnetic noise reduction capability of the ferrite core in a construction in which wiring and a ferrite core are integrated by mold forming.

In order to achieve the above-described object, a first aspect of the present invention provides an on-vehicle electronic device including wiring and a ferrite core that covers the wiring to absorb electromagnetic noise from the wiring, in which the ferrite core and the wiring are integrated by mold forming using a resin material in a state of exposing a part of the ferrite core.

In order to achieve the above-described object, a second aspect of the present invention provides a motor-driven compressor including a compressing unit that compresses and discharges a refrigerant, an electric motor that drives the compressing unit, and an inverter that controls the electric motor, the inverter including a substrate on which an electronic component is mounted, a case in which the substrate is housed, wiring that connects a connector provided on the case and the substrate, and a ferrite core that covers the wiring to absorb electromagnetic noise from the wiring, in which the ferrite core and the wiring are integrated by mold forming using a resin material in a state of exposing a part of the ferrite core.

DETAILED DESCRIPTION OF THE PREFERRED EMBODIMENTS

An embodiment of an on-vehicle electronic device which is an electronic device mounted in a vehicle will be described with reference to FIG. 1 to FIG. 4. The on-vehicle electronic device is an inverter that controls an electric motor provided in a motor-driven compressor mounted on a vehicle. The motor-driven compressor is used for, for example, a heat pump of a car air conditioner. In the following, description will be given of an outline of the heat pump and the motor-driven compressor, followed by description of the inverter.

Figure 1:
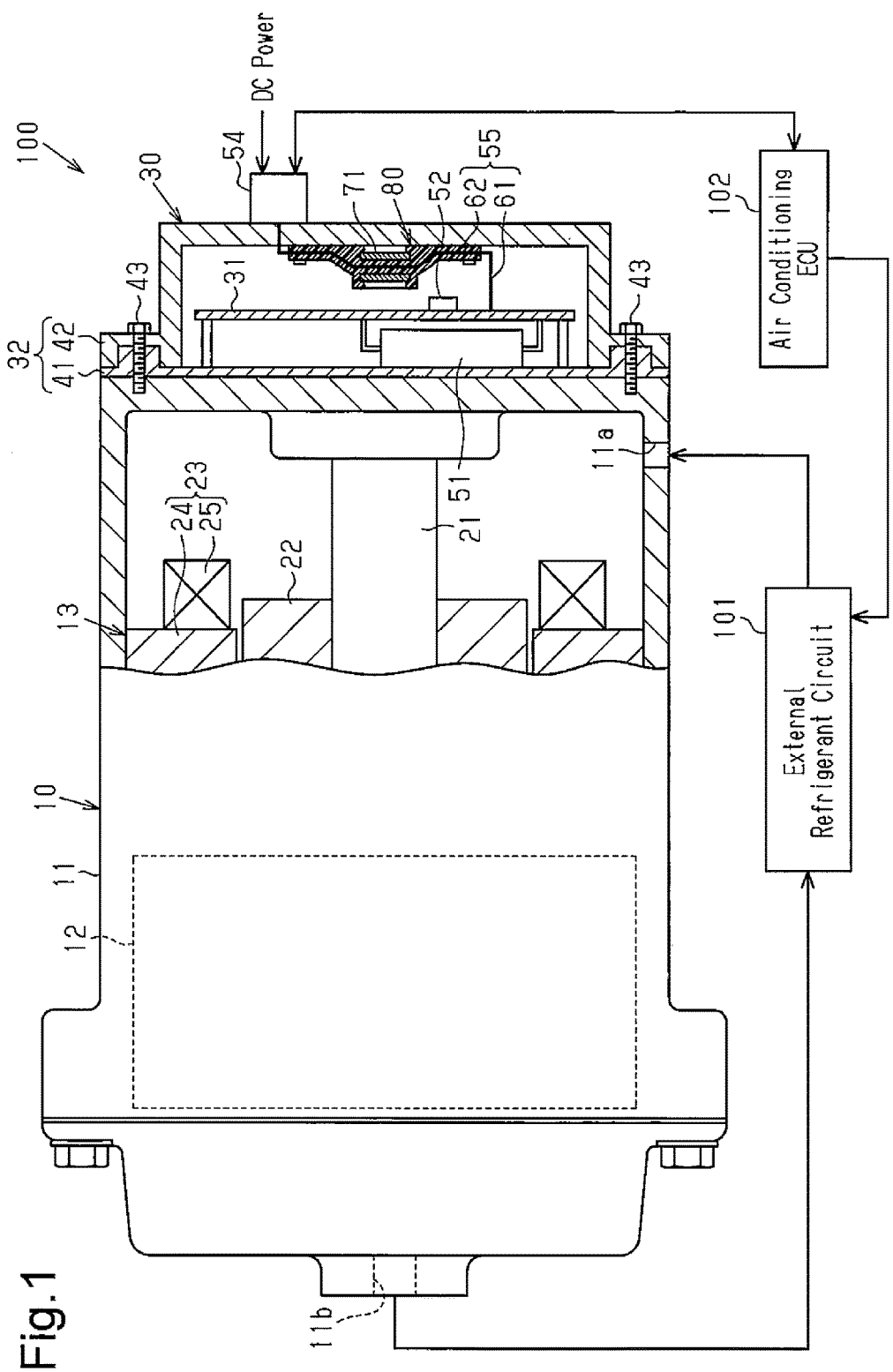
FIG. 1 is a schematic view showing an outline of a motor-driven compressor and a heat pump.

As shown in FIG. 1, the heat pump 100 includes a motor-driven compressor 10 and an external refrigerant circuit 101 that supplies a refrigerant to the motor-driven compressor 10. The external refrigerant circuit 101 has, for example, a heat exchanger and an expansion valve, etc. The heat pump 100 performs air conditioning of the interior of a vehicle cabin by compressing the refrigerant by the motor-driven compressor 10 and also performing heat exchange and expansion of the refrigerant by the external refrigerant circuit 101.

The heat pump 100 includes an air conditioning ECU 102 that controls the heat pump 100 as a whole. The air conditioning ECU 102 is constructed to be able to grasp an in-car temperature, a set temperature of the car air conditioner, and the like. The air conditioning ECU 102 sends various commands including an ON/OFF command and a rotation speed command to the motor-driven compressor 10 based on parameters such as the in-car temperature and set temperature of the car air conditioner.

The motor-driven compressor 10 includes a housing 11 and a compressing unit 12 and an electric motor 13 housed in the housing 11. A suction port 11a through which a refrigerant is suctioned from the external refrigerant circuit 101 is formed in the housing 11.

The housing 11 is formed in a substantially circular cylindrical shape. The housing 11 is made of a thermally conductive metal material such as aluminum. In the housing 11, a discharge port 11b through which a refrigerant is discharged is formed.

The refrigerant is suctioned into the housing 11 through the suction port 11a, and then compressed in a compression chamber in the compressing unit 12 to be discharged from the discharge port 11b. The compressing unit 12 may be of an arbitrary construction such as a scroll type, a piston type, or a vane type.

The electric motor 13 drives the compressing unit 12. The electric motor 13 has a columnar rotary shaft 21, a circular cylindrical rotor 22 secured to the rotary shaft 21, and a stator 23 secured to the housing 11. The rotary shaft 21 is, for example, supported to be rotatable with respect to the housing 11. The rotary shaft 21 has an axial direction coincident with that of the housing 11. The stator 23 has a circular cylindrical stator core 24 and a coil 25. The coil 25 is wound around teeth formed in the stator core 24. The rotor 22 and the stator 23 are arranged opposite to each other in a radial direction of the rotary shaft 21.

As shown in FIG. 1, the motor-driven compressor 10 includes an inverter 30 as an on-vehicle electronic device to drive the electric motor 13. The inverter 30 includes a substrate 31 mounted with electronic components and a case 32 housing the substrate 31. The coil 25 of the electric motor 13 is connected to the inverter 30 by a connector (not shown) or the like.

The case 32 is made of a thermally conductive metal material such as aluminum. The case 32 has a plate-shaped first case structure 41 and a second case structure 42 in a cylindrical shape with a bottom assembled onto the first case structure 41. The case 32 is secured to the housing 11 by securing means such as, for example, bolts 43. That is, the inverter 30 is integrated into the motor-driven compressor 10.

Figure 2:
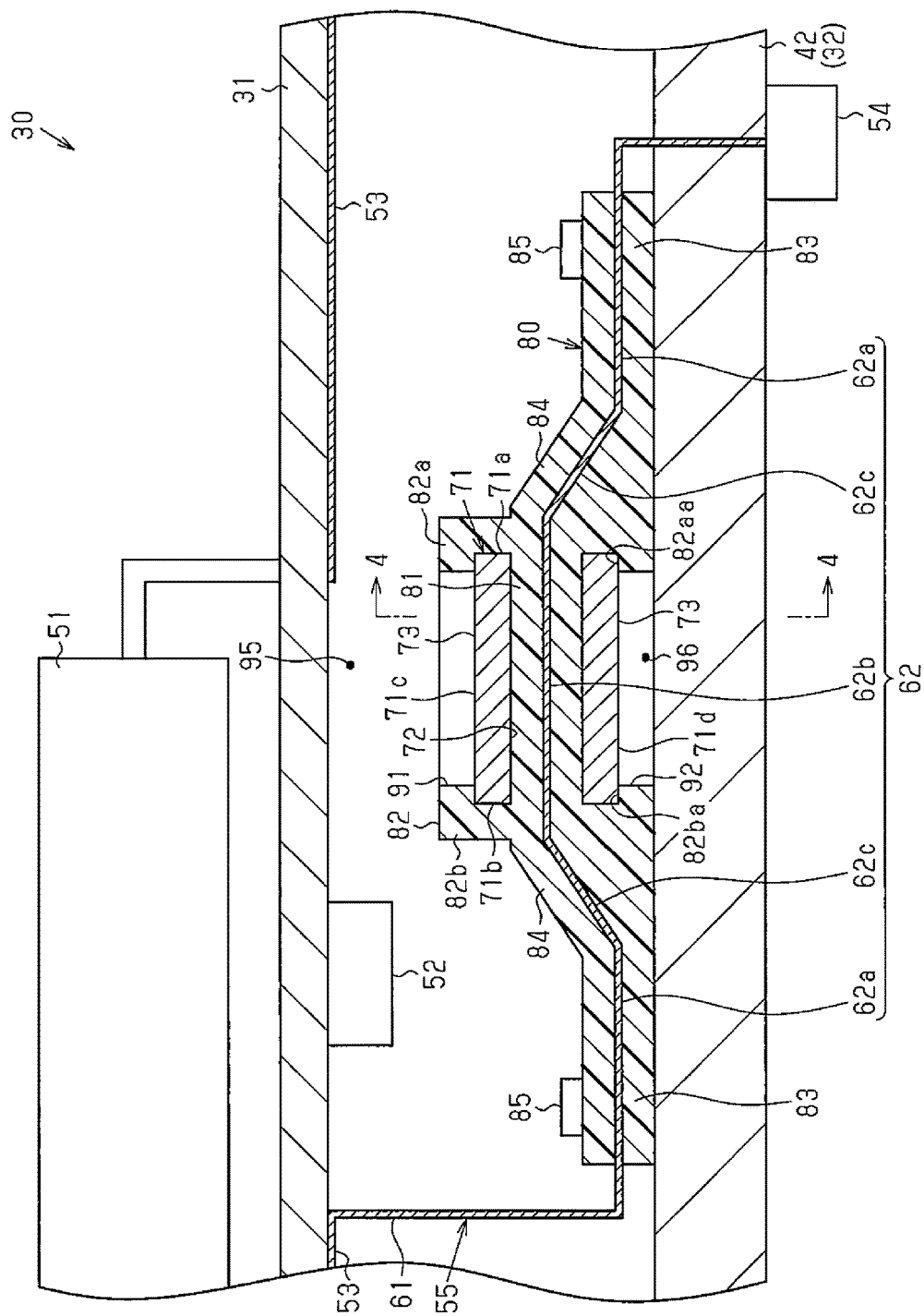
FIG. 2 is a sectional view of an inverter.

On the substrate 31, for example, a power module 51 and a temperature sensor 52, etc., are mounted as the electronic components. The power module 51 is arranged near the first case structure 41 in the housing 11. Also, as shown in FIG. 2, a mounting wiring 53 is provided on the substrate 31. The mounting wiring 53 connects a plurality of components. A signal or electrical power is transmitted to the components via the mounting wiring 53.

As shown in FIG. 1 and FIG. 2, the inverter 30 includes a connector 54 and a bus bar 55 as a wiring to connect the substrate 31 and the connector 54. The connector 54 is provided on an outer surface of the second case structure 42 of the case 32. The bus bar 55 is arranged such that the substrate 31 is located between the power module 51 and the bus bar 55. Electric power is supplied to the inverter 30 from a DC power supply referred to as an external power supply via the connector 54. Also, the air conditioning ECU 102 is electrically connected with the inverter 30 via the connector 54.

The bus bar 55 has a bent shape as shown in FIG. 2. The bus bar 55 has a standing portion 61 that stands up from the substrate 31 and an extending portion 62 that extends continuously from the standing portion 61. The extending portion 62 extends along an inner surface of the second case structure 42. The extending portion 62 is formed in a manner of depressing a part thereof toward the substrate 31. The extending portion 62 has a first part 62a, a second part 62b arranged nearer the substrate 31 than the first part 62a, and a connection part 62c that connects the first part 62a and the second part 62b. In the present embodiment, two bus bars 55 exist.

Next, the inverter 30 including a construction to reduce electromagnetic noise to be generated in the bus bar 55 will be described with reference to FIG. 2 to FIG. 4.

Figure 3:
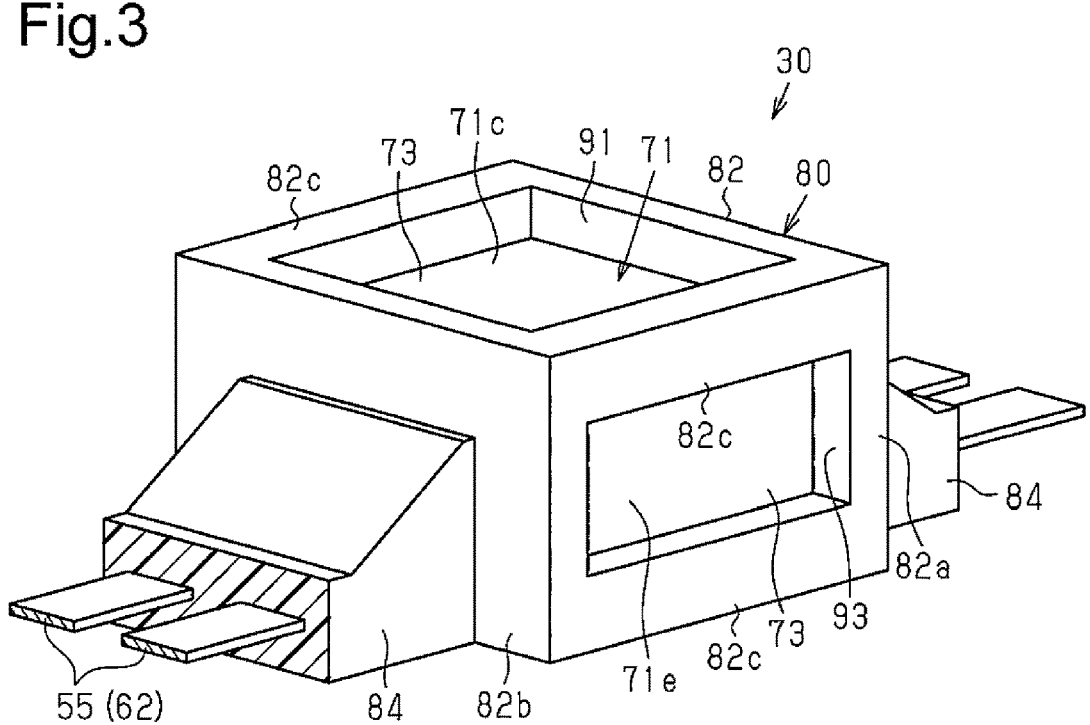
FIG. 3 is a perspective view schematically showing a structure of a ferrite core and its periphery.
Figure 4:
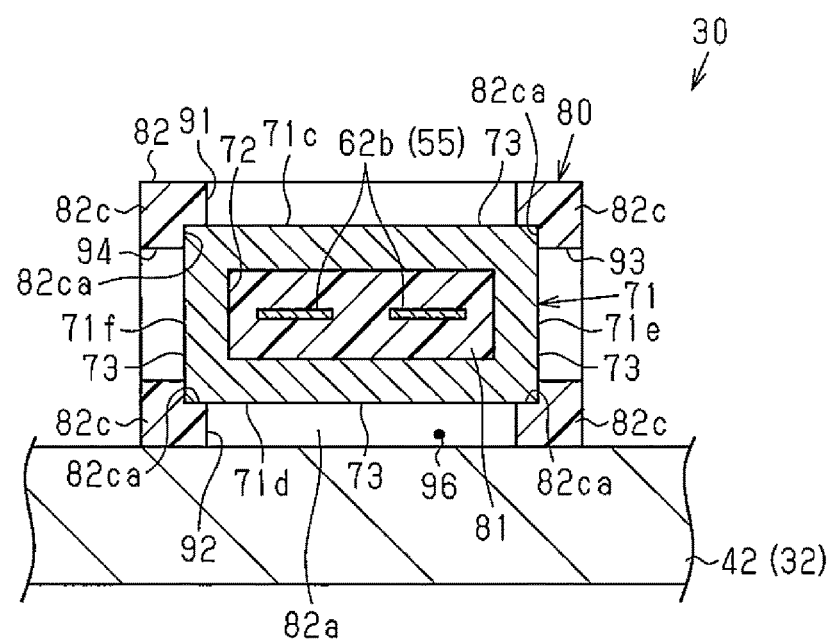
FIG. 4 is a sectional view taken along a line 4-4 in FIG. 2.

As shown in FIG. 2 to FIG. 4, the inverter 30 includes a ferrite core 71 that covers the bus bar 55 to absorb electromagnetic noise from the bus bar 55. The ferrite core 71 reduces electromagnetic noise of the bus bar 55. The ferrite core 71 is formed in a cylindrical shape having an insertion hole 72 through which the bus bars 55 can be inserted. The ferrite core 71 is formed in a polygonal cylindrical shape, in detail, a rectangular cylindrical shape. The ferrite core 71 has a rectangular frame shape when viewed in a direction perpendicular to its axis direction. As shown in FIG. 2, the ferrite core 71 has end surfaces 71a and 71b at both axial end portions. Also, as shown in FIG. 4, the ferrite core 71 has four side surfaces 71c to 71f as its outer peripheral surface.

The second part 62b of the extending portion 62 of the bus bar 55 is inserted through the insertion hole 72 of the ferrite core 71. The bus bars 55 are, in this state, integrated into the ferrite core 71 by mold forming using a resin material 80, in other words, injection molding. In this case, the second part 62b is covered at its periphery with the ferrite core 71. Also, the second part 62b has an extending direction coincident with the axis direction of the ferrite core 71. In the present embodiment, the second part 62b corresponds to a "part covered with a ferrite core of a wiring." The resin material 80 is made of, for example, a thermoplastic resin. The resin material 80 has insulation properties.

As shown in FIG. 2, the resin material 80 has an inner resin portion 81 filled in the insertion hole 72 and an outer resin portion 82 that covers the ferrite core 71 from outside. The inner resin portion 81 and the outer resin portion 82 hold the ferrite core 71.

As shown in FIG. 3, the outer resin portion 82 is formed in a frame shape surrounding the ferrite core 71. In detail, the outer resin portion 82 is formed in a rectangular parallelepiped frame shape corresponding to the shape of the ferrite core 71 that is a rectangular cylindrical shape. The outer resin portion 82 has base portions 82a and 82b arranged opposite to each other in the axis direction of the ferrite core 71. Both base portions 82a and 82b are formed in rectangular plate shapes that are slightly larger than the end surfaces 71a and 71b of the ferrite core 71.

As shown in FIG. 2, the base portions 82a and 82b have recess portions 82aa and 82ba in their centers, respectively. The ferrite core 71 and the inner resin portion 81 are fitted with the recess portion 82aa of the first base portion 82a. That is, the first base portion 82a covers the first end surface 71a of the ferrite core 71 and a part of the mutually opposing side surfaces 71c and 71d.

Similarly, the ferrite core 71 and the inner resin portion 81 are fitted with the recess portion 82ba of the second base portion 82b. That is, the second base portion 82b covers the second end surface 71b of the ferrite core 71 and a part of the mutually opposing side surfaces 71c and 71d.

The outer resin portion 82 has a plurality of pillar-shaped coupling portions 82c in order to couple both base portions 82a and 82b. The coupling portions 82c couple corner portions of the base portions 82a and 82b with each other. The coupling portions 82c are provided one each in four circumferentially separated points of the ferrite core 71.

As shown in FIG. 4, a cut-away portion 82ca is provided in the coupling portion 82c to extend in the extending direction of the second part 62b of the bus bar 55. A corner portion of the ferrite core 71 is fitted with the cut-away portion 82ca of each coupling portion 82c.

A plurality of opening portions 91 to 94 are formed in the outer resin portion 82. From each of the plurality of opening portions 91 to 94, four surfaces of the ferrite core 71 facing in directions to intersect the extending direction of the second part 62b are respectively exposed in part. In detail, four opening portions 91 to 94 are formed corresponding to each of the four side surfaces 71c to 71f of the ferrite core 71 facing in directions to cross the extending direction of the second part 62b. The plurality of opening portions 91 to 94 are defined by both base portions 82a and 82b and the coupling portions 82c. The respective opening portions 91 to 94 are arranged on both sides of the coupling portions 82c and arrayed along the circumferential direction of the ferrite core 71. The side surfaces 71c to 71f of the ferrite core 71 are respectively exposed in part from each corresponding opening portion of the opening portions 91 to 94. The opening portions 91 to 94 are formed in rectangular shapes that are slightly smaller than the side surfaces 71c to 71f, corresponding to the shapes of the side surfaces 71c to 71f being in rectangular shapes. In the following, the part of the ferrite core 71 that is not covered with the outer resin portion 82 and exposed from the opening portions 91 to 94 will be referred to as an exposed part 73.

As shown in FIG. 2, the extending portion 62 as a whole excluding both ends thereof is covered with the resin material 80. The resin material 80 includes a first resin cover portion 83 that covers the first part 62a and a second resin cover portion 84 that covers the connection part 62c. The first resin cover portion 83, the second resin cover portion 84, and the inner resin portion 81 and the outer resin portion 82 are integrated.

Also, the resin material 80 is attached to an inner surface of the case 32 together with the ferrite core 71 integrated with the resin material 80. The resin material 80 is fixed to the inner surface of the second case structure 42 by fastening portions such as, for example, screws 85.

The outer resin portion 82 does not project to a side opposite to the substrate 31 further than the first resin cover portion 83 covering the first part 62a of the resin material 80. In other words, the second part 62b of the extending portion 62 attached with the ferrite core 71 is arranged nearer to the substrate 31 than the first part 62a such that the ferrite core 71 and the outer resin portion 82 do not project to the side opposite to the substrate 31 further than the first resin cover portion 83. In this case, a first surface opposing to the second case structure 42 of the outer resin portion 82 is flush with a second surface opposing to the second case structure 42 of both resin cover portions 83 and 84. The first surface and the second surface are both in contact with the inner surface of the second case structure 42.

The substrate 31 is separated from the ferrite core 71. A first gap 95 is provided between the substrate 31 and the ferrite core 71. Therefore, the exposed part 73 of the ferrite core 71 does not contact the substrate 31. Also, the outer resin portion 82 that covers the ferrite core 71 is also separated from the substrate 31.

The outer resin portion 82 is abutted on the second case structure 42. A second gap 96 is formed between the exposed part 73 of the ferrite core 71 exposed from the opening portion 92, that is, the exposed part 73 of the side surface 71d of the ferrite core 71 and the second case structure 42. The second gap 96 is provided at a position corresponding to the opening portion 92.

Next, operation of the on-vehicle electronic device described above shall now be described.

The bus bar 55 is integrated into the ferrite core 71 by mold forming. Also, a part of the ferrite core 71 is exposed from the opening portions 91 to 94.

As above, the present embodiment provides the following effects.

(1) The inverter 30 as an on-vehicle electronic device includes the bus bar 55 as a wiring and the ferrite core 71 that covers the bus bar 55 to absorb electromagnetic noise from the bus bar 55. The bus bar 55 and the ferrite core 71 are integrated by mold forming using the resin material 80 in a state of exposing a part of the ferrite core 71. According to this arrangement, a shift in relative position between the bus bar 55 and the ferrite core 71 due to vibration can be suppressed. Also, according to this arrangement, because stress to be applied to the ferrite core 71 can be reduced, a reduction in the impedance of the ferrite core 71 can be suppressed. Accordingly, a disadvantage that occurs in the case of integrating the bus bar 55 and the ferrite core 71 by mold forming, in detail, a reduction in the electromagnetic noise reduction capability of the ferrite core 71 due to stress applied to the ferrite core 71 from the resin material 80 can be suppressed.

Also, heat generated in the ferrite core 71 is dissipated from the exposed part 73 of the ferrite core 71. The ferrite core 71 is thereby improved in heat dissipation.

(2) The resin material 80 has the inner resin portion 81 filled in the insertion hole 72. The bus bar 55 and the ferrite core 71 are integrated by the inner resin portion 81. The resin material 80 further has the outer resin portion 82 that covers the ferrite core 71 from outside. The opening portions 91 and 94 are formed in the outer resin portion 82 to expose the ferrite core 71. The effect in (1) above can thereby be obtained.

(3) The outer resin portion 82 has the two base portions 82a and 82b arranged opposite to each other in the axis direction of the ferrite core 71 (extending direction of the second part 62b) and the plurality of pillar-shaped coupling portions 82c that couple both bases 82a and 82b. The outer resin portion 82 is formed in a frame shape surrounding the ferrite core 71. Also, by both base portions 82a and 82b and the plurality of coupling portions 82c, the plurality of opening portions 91 to 94 arrayed in the circumferential direction of the ferrite core 71 are defined. The exposed part 73 can thereby be increased in area to more effectively reduce stress to be applied to the ferrite core 71.

(4) The resin material 80 is attached to the inner surface of the case 32 together with the ferrite core 71 integrated with the resin material 80. Also, the ferrite core 71 is separated from the substrate 31. Contact between the ferrite core 71 and the substrate 31 can thereby be suppressed even if a part of the ferrite core 71 is exposed.

(5) The extending portion 62 of the bus bar 55 extends along the inner surface of the second case structure 42, and is also formed in a manner of depressing a part of the extending portion 62 toward the substrate 31. That is, the extending portion 62 has the first part 62a and the second part 62b arranged nearer the substrate 31 than the first part 62a. Also, the ferrite core 71 is attached to the second part 62b. That is, the ferrite core 71 and the bus bar 55 are integrated in a state of the second part 62b being inserted through the insertion hole 72. Both the ferrite core 71 and the outer resin portion 82 covering the ferrite core 71 can thereby be suppressed from projecting further than the first resin cover portion 83 covering the first part 62a. Accordingly, it is not necessary to project a part of the second case structure 42 corresponding to the ferrite core 71 and the outer resin portion 82. An increase in size of the case 32 can thus be suppressed.

(6) The motor-driven compressor 10 includes the compressing unit 12 that compresses and discharges a refrigerant and the electric motor 13 that drives the compressing unit 12. The inverter 30 controls the electric motor 13. In this case, if electromagnetic noise is generated in the bus bar 55 of the inverter 30, the control of the electric motor 13 is affected. In contrast, according to the present embodiment, electromagnetic noise to be generated in the bus bar 55 of the inverter 30 can be reduced by the ferrite core 71. The electric motor 13 can thereby be satisfactorily controlled.

The above-described embodiment can be modified as follows.

Figure 5:
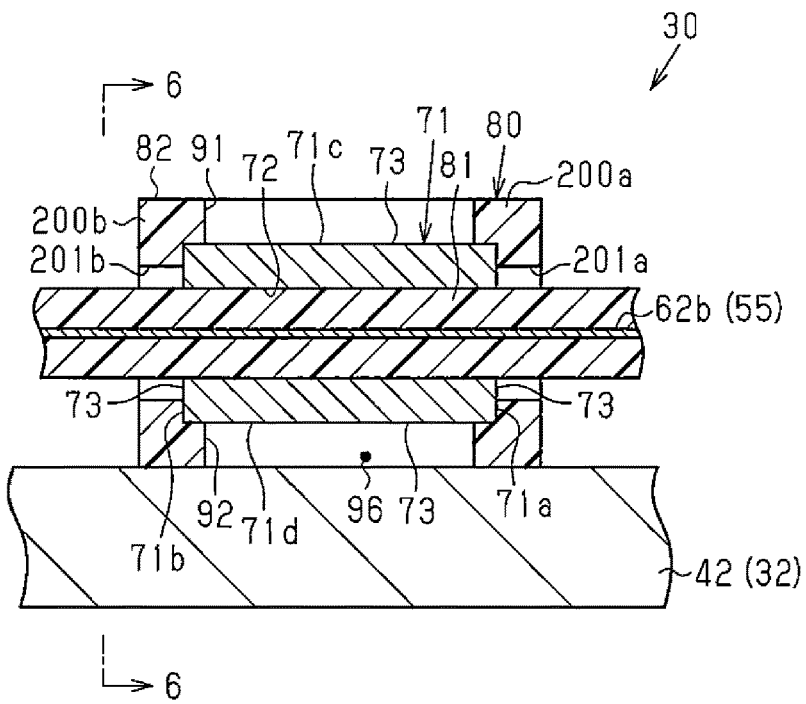
FIG. 5 is a sectional view showing a resin material of another example.
Figure 6:
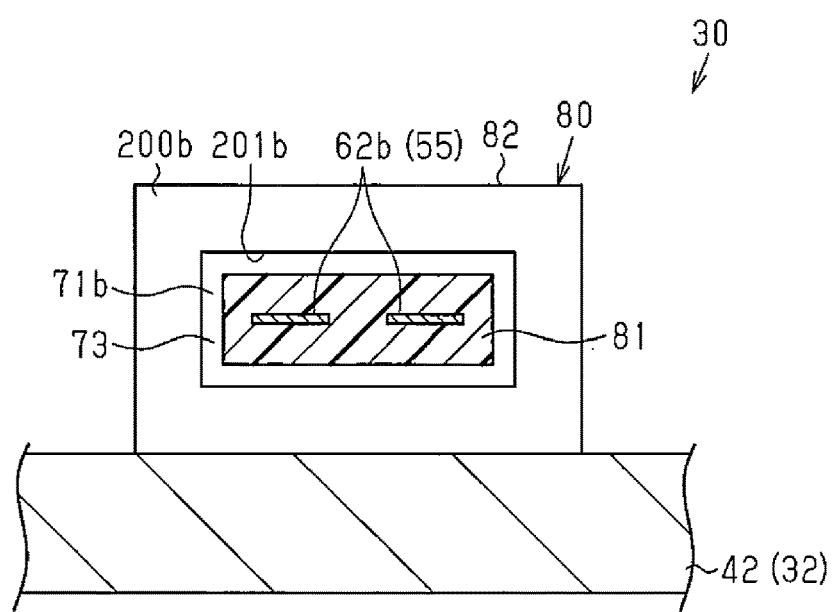
FIG. 6 is a sectional view taken along a line 6-6 in FIG. 5.

As shown in FIG. 5 and FIG. 6, also in both base portions 200a and 200b that are arranged opposite to each other in the axis direction of the ferrite core 71, opening portions 201a and 201b may be formed. In this case, both base portions 200a and 200b are formed in rectangular frame shapes. Both end surfaces 71a and 71b in the axis direction of the ferrite core 71 are thereby exposed from the opening portions 201a and 201b. That is, the exposed part 73 is also formed in both end surfaces 71a and 71b of the ferrite core 71. Accordingly, stress to be applied to the ferrite core 71 can be further reduced. For facilitating mold forming, it is preferable not to form the opening portions 201*a* and 201*b*.

Opening portions to be formed in the outer resin portion 82 are in arbitrary numbers and shapes, and may be one in number. It suffices that at least one opening portion is formed.

The bus bars 55 to be inserted through the insertion hole 72 of the ferrite core 71 are not limited to two in number, and are in arbitrary numbers. Also, the wiring is also in an arbitrary shape, and may be in a belt shape or stick shape.

While a description has been made that the extending portion 62 is formed in a manner of depressing a part thereof toward the substrate 31, the extending portion 62 may be formed without being depressed.

The resin material 80 may be formed using a thermosetting resin. In this case also, stress is applied to the ferrite core 71 due to cure shrinkage, but as in the foregoing, by exposing a part of the ferrite core 71, stress to be applied to the ferrite core 71 can be reduced.

The ferrite core 71 and the outer resin portion 82 are in arbitrary shapes. For example, the ferrite core may be formed in a columnar shape or an elliptical columnar shape. In this case, it is preferable to form the base portions of the outer resin portion in disk shapes or circular ring shapes or in elliptical shapes or elliptical ring shapes.

The on-vehicle electronic device is not limited to an inverter 30 to control an electric motor 13 of a motor-driven compressor 10 to be mounted on a vehicle, and is arbitrary as long as it is a device to be mounted on a vehicle and having wiring and a ferrite core 71.

While a description has been made that the inverter 30 is integrated into the motor-driven compressor 10, the inverter 30 may be separate from the motor-driven compressor 10.

A connection target of the bus bar 55 into which the ferrite core 71 is integrated is not limited to the substrate 31 and the connector 54, and is arbitrary. That is, the wiring to which the ferrite core 71 is attached is arbitrary. For example, the mounting wiring 53 provided on the substrate 31 and the ferrite core 71 may be integrated by mold forming.

The invention claimed is:

1. An inverter that functions as an on-vehicle electronic device, which controls an electric motor provided in a motor-driven compressor mounted on a vehicle, the inverter comprising:
   a substrate mounted with an electronic component;
   a case in which the substrate is housed;
   wiring connected to the substrate; and
   a ferrite core that covers the wiring to absorb electromagnetic noise from the wiring, wherein
   the ferrite core and the wiring are integrated by mold forming using a resin material and covered with the resin material,
   the ferrite core is covered with the resin material such that the resin material goes beyond both longitudinal ends of the ferrite core,
   an opening is formed in the resin material such that the opening opens in a radial direction of the wiring, and
   a part of the ferrite core is exposed through the opening.

2. The inverter according to claim 1, wherein
   the resin material has an outer resin portion that covers the ferrite core from outside, and
   the opening is formed in the outer resin portion.

3. The inverter according to claim 2, wherein
   the outer resin portion has two base portions and a plurality of pillar-shaped coupling portions that couple the two base portions, and
   the two base portions are arranged opposite to each other in an extending direction of a part covered with the ferrite core of the wiring.

4. The inverter according to claim 1,
   wherein
   the resin material is attached to an inner surface of the case together with the ferrite core, and
   the ferrite core is separated from the substrate.

5. A motor-driven compressor mounted on a vehicle comprising:
   a compressing unit that compresses and discharges a refrigerant;
   an electric motor that drives the compressing unit; and
   an inverter that controls the electric motor provided in the motor-driven compressor,
   the inverter comprising:
   a substrate on which an electronic component is mounted;
   a case in which the substrate is housed;
   wiring connected to the substrate, and
   a ferrite core that covers the wiring to absorb electromagnetic noise from the wiring, wherein
   the ferrite core and the wiring are integrated by mold forming using a resin material and covered with the resin material,
   the ferrite core is covered with the resin material such that the resin material goes beyond both longitudinal ends of the ferrite core,
   an opening is formed in the resin material such that the opening opens in a radial direction of the wiring; and
   a part of the ferrite core is exposed through the opening.

6. The inverter according to claim 1, wherein
   the ferrite core is formed in a cylindrical shape,
   the wiring is inserted through an inside of the ferrite core, and
   the opening is arranged at a position corresponding to a side surface of the ferrite core.

7. The inverter according to claim 1, wherein
   at least a part of the wiring extends along the substrate.

* * * * *